United States Patent
Schaer, III et al.

(10) Patent No.: US 12,516,666 B2
(45) Date of Patent: Jan. 6, 2026

(54) HIGH PRESSURE RECIPROCATING PUMP WITH TWO PIECE SUCTION VALVE ASSEMBLY

(71) Applicant: Federal Signal Corporation, Oak Brook, IL (US)

(72) Inventors: John B. Schaer, III, Brenham, TX (US); Andrew J. Widrig, Meridian, ID (US)

(73) Assignee: Federal Signal Corporation, Downers Grove, IL (US)

( * ) Notice: Subject to any disclaimer, the term of this patent is extended or adjusted under 35 U.S.C. 154(b) by 709 days.

(21) Appl. No.: 17/743,770

(22) Filed: May 13, 2022

(65) Prior Publication Data

US 2023/0366395 A1 Nov. 16, 2023

(51) Int. Cl.
| | | |
|---|---|---|
| F04B 53/10 | (2006.01) | |
| F04B 19/04 | (2006.01) | |
| F04B 19/22 | (2006.01) | |
| F04B 53/16 | (2006.01) | |

(52) U.S. Cl.
CPC .......... F04B 53/1087 (2013.01); F04B 19/04 (2013.01); F04B 19/22 (2013.01); F04B 53/103 (2013.01); F04B 53/1032 (2013.01); F04B 53/108 (2013.01); F04B 53/109 (2013.01); F04B 53/164 (2013.01)

(58) Field of Classification Search
CPC ...... F04B 53/1087; F04B 19/04; F04B 19/22; F04B 53/103; F04B 53/1032; F04B 53/108; F04B 53/109; F04B 53/164; F16K 15/026; F16K 1/46
See application file for complete search history.

(56) References Cited

U.S. PATENT DOCUMENTS

| | | | |
|---|---|---|---|
| 6,231,323 B1 * | 5/2001 | Jezek | F04B 53/164 137/493.9 |
| 6,843,481 B1 * | 1/2005 | Kittock | F04B 53/164 277/411 |
| 9,382,905 B2 | 7/2016 | Huang | |
| 11,359,615 B2 | 6/2022 | Thomas et al. | |
| 2004/0105768 A1 | 6/2004 | Cameron et al. | |
| 2005/0249615 A1 * | 11/2005 | Jezek | F04B 53/168 417/415 |
| 2007/0095405 A1 | 5/2007 | Nigrin et al. | |
| 2009/0278069 A1 * | 11/2009 | Blanco | F16K 15/063 251/317 |

(Continued)

Primary Examiner — Bryan M Lettman
(74) Attorney, Agent, or Firm — Merchant & Gould P.C.

(57) ABSTRACT

A high pressure reciprocating pump for high fluid pressures having a valve cartridge positioned within a manifold block of the pump. The valve cartridge has a fixed body with a plurality of equally spaced suction openings. A central bore of the valve cartridge body has a valve assembly mounted therein. Valve assembly include a discharge valve member and a two-piece suction valve member mounted for sliding movement about the outer surface of discharge valve member. On the suction stroke, the two piece suction valve member is opened and fluid through suction openings enters the pump chamber. On the discharge stroke, high pressure fluid is discharged through the central bore and lateral slots of open discharge valve member past seat. The two-piece suction valve includes a spring seat and a hard sealing member.

18 Claims, 6 Drawing Sheets

(56) References Cited

U.S. PATENT DOCUMENTS

| | | | |
|---|---|---|---|
| 2014/0070127 A1* | 3/2014 | Blume | F16K 15/063 |
| | | | 251/359 |
| 2015/0071803 A1* | 3/2015 | Huang | F04B 39/1046 |
| | | | 417/560 |
| 2018/0087481 A1* | 3/2018 | Koshimoto | F16K 17/04 |
| 2019/0301622 A1* | 10/2019 | Huang | F16K 1/46 |
| 2019/0368619 A1* | 12/2019 | Barnett | F04B 53/1032 |
| 2021/0017982 A1* | 1/2021 | Bayyouk | F16K 25/005 |
| 2021/0148208 A1 | 5/2021 | Thomas et al. | |

* cited by examiner

HIGH PRESSURE RECIPROCATING PUMP WITH TWO PIECE SUCTION VALVE ASSEMBLY

TECHNICAL FIELD

This disclosure relates to high pressure reciprocating pumps of the type used in high pressure water jet applications, and more particularly to an improved valve cartridge for fitting between pump elements.

BACKGROUND

U.S. Pat. No. 4,878,815, incorporated herein by reference, shows a high pressure reciprocating pump utilizing high pressure water jet cleaning for producing fluid pressure up to 35,000 psi. When higher pressures are encountered, such as pressures in the range of 50,000 psi to 60,000 psi, stress concentrations at such high fluid pressure result in undue wear and cracks, particularly adjacent the entrances to discharge flow holes or openings through which the high pressure fluid is discharged on the discharge stroke. Stress concentrations are high at the corners of the openings and hard alloy materials for such areas are expensive and difficult to machine or round at the corners where the stress concentrations occur. Particularly where small diameter openings are provided for very high fluid pressures, the corners or entrances to such small diameter openings are difficult for machine or chamfer.

As shown in the '815 patent, the plunger in the suction stroke results in opening of the suction valve to permit fluid within the pump chamber. Then, during the following discharge stroke, the high fluid pressure is discharged from the pump chamber through a plurality of relatively small discharge holes or openings into a large discharge port. The corners of the entrances to the plurality of relatively small discharge openings are subjected to stress concentrations from the high fluid pressure during the discharge stroke which may result in wear and some cracks at very high pressures encountered.

U.S. Pat. No. 6,231,323, incorporated herein by reference, improved the '815 patent pump by providing a high pressure reciprocating pump for high fluid pressures between 30,000 and 60,000 psi in which high stress concentrations are minimized. Further, the '323 patent pump provided such a high pressure reciprocating pump in which a replaceable valve cartridge was utilized.

However, the '323 patent pump has a limited life due to damage to the sealing surfaces over time. This damage usually begins with a small dent caused by a contaminant in the supply water. If this dent is large enough to allow leakage, a high velocity jet of the pumped fluid forms in this leakage path, causing cavitation erosion of the seating surface. This erosion causes more leakage, and the process continues until the leakage in sufficient to interfere with normal operation of the pump. Further, the edges of the initial dent are typically raised above the un-damaged surface. The contact stress between this raised area and the mating part can be very high. In some cases, this can cause galling (cold welding) between the mating parts, accelerating the damage to the sealing surfaces. Many of the materials typically used for high pressure valves are very susceptible to galling. Improvements are desirable.

SUMMARY

The present disclosure is directed to improving the prior art.

In accordance with principles of this disclosure, a two piece suction valve assembly is provided. The assembly includes: a hard sealing member having an outer cylindrical surrounding wall, a first axial surface, an opposite second axial surface, and defining a center bore extending through the first and second axial surfaces; and a spring seat having: an outer circular flange with a diameter about the same as a diameter of the surrounding wall; a first face surface within the flange; an opposite second face surface; a cylindrical tube extending from the second face surface; and a central hole extending through the first face surface, second face surface, and the cylindrical tube; wherein the cylindrical tube extends through the center bore of the hard sealing member; and the second face surface of the spring seat is against the first axial surface of the hard sealing member.

The first face surface is preferably sloped from the flange to the center hole.

The first axial surface is preferably sloped from the surrounding wall to the center bore.

In examples, the cylindrical tube projects outward and away from the second axial surface of the hard sealing member.

In some implementations, the central hole has a diameter less than 50%, and preferably less than 35% of the diameter of the circular flange Preferably, the spring seat is stainless steel; and the hard sealing member is ceramic.

In another aspect, a valve cartridge for positioning in an opening between a manifold block and a mounting plate of a high pressure reciprocating pump with a reciprocating plunger adjacent the valve cartridge for operation of the pump in a suction stroke and a discharge stroke is provided. The valve cartridge comprises: a body having a cylindrical bore defining an inner peripheral surface and an annular valve seat adjacent an end of the bore; a discharge valve member having a cylindrical body mounted within the bore against the inner peripheral surface with one end of the valve member adjacent the plunger and an opposed end of the valve member being closed and having an enlarged diameter to define a seating surface for engaging the valve seat; the discharge valve member having a circumferential wall defining a central bore, the circumferential wall having a plurality of openings adjacent the closed end; a spring member continuously urging the discharge valve member into sealing relation with the valve seat; a pump chamber defined between the plunger and the discharge valve member; and a two piece suction valve assembly including a spring seat held within a hard sealing member; the two piece suction valve assembly being slidably mounted about the discharge valve member and permitting fluid to enter the pump chamber during the suction stroke of the plunger; the plunger in the discharge stroke forcing fluid through the discharge valve member for unseating of the discharge valve member and discharge of pressurized fluid through the openings past the seat into a discharge chamber; the effective area of the discharge chamber being greater than the effective area of the pump chamber for urging hydraulically the body against the mounting plate.

the spring member is compressed between the spring seat and the spring retainer for continuously biasing the two piece suction valve assembly and the discharge valve member toward closed position.

In one or more embodiments, a plurality of suction openings are spaced about the outer periphery of the valve cartridge body and extend through the body for providing fluid communication between a suction chamber adjacent the valve cartridge and the pumping chamber; the two piece suction valve assembly being positioned in closed position over the suction openings adjacent the pump chamber.

In example embodiments, a plurality of suction openings spaced about the outer periphery of the valve cartridge body, the hard sealing member of the two piece suction valve assembly extending over the suction openings.

In many examples, the two piece suction valve is in sliding contact relation with the inner peripheral surface of the bore and the cylindrical body for being guided therebetween.

Preferably, the spring seat and hard sealing member are positioned about the cylindrical discharge valve member and mounted for relative sliding movement thereon.

In one or more embodiments, the spring seat is stainless steel; and the hard sealing member is ceramic.

In example embodiments, the hard sealing member having an outer cylindrical surrounding wall, a first axial surface, an opposite second axial surface, and defining a center bore extending through the first and second axial surfaces; and the spring seat has an outer circular flange with a diameter about the same as a diameter of the surrounding wall; a first face surface within the flange; an opposite second face surface; a cylindrical tube extending from the second face surface; and a central hole extending through the first face surface, second face surface, and the cylindrical tube; wherein the cylindrical tube extends through the center bore of the hard sealing member; and the second face of the spring seat is against the first axial surface of the hard sealing member.

In another aspect, in a high pressure reciprocating fluid pump having a manifold block, a stuffing box fitting against the manifold block, a clamping plate removably secured to the manifold block and mounting the stuffing box onto the manifold block, and a reciprocating plunger mounted within the stuffing box; a valve cartridge positioned in an opening between the manifold block and the stuffing box, the valve cartridge is provided including: a body having a central bore therethrough and a fixed valve seat adjacent an end of the central bore; a generally cylindrical discharge valve member mounted within the bore, the discharge valve member having a circumferential wall defining an axial bore with a closed downstream end having an enlarged diameter defining a seating surface for seating on the fixed valve seat during a suction stroke and moveable to an unseated position during a discharge stroke of plunger; a spring continuously urging the discharge valve member into sealing relation with the valve seat; a pump chamber defined between the plunger and the discharge valve member; and a two piece suction valve assembly permitting fluid to enter the pump chamber during a suction stroke of the plunger, the two piece suction valve assembly including a spring seat held within a ceramic sealing member; the plunger on a discharge stroke forcing fluid through the axial bore of the discharge valve member for unseating of the discharge valve member and discharge of fluid through the axial bore past the seat into a discharge chamber.

In one or more embodiments, the spring seat and ceramic sealing member are positioned about the cylindrical discharge valve member and mounted for relative sliding movement thereon.

In example embodiments, the spring has opposed ends seated on the spring seat and the spring retainer for continuously biasing the two piece suction valve assembly and the discharge valve member toward a closed position.

In many examples, there is a suction port in the manifold block, and a suction passage extending from the suction port to an annular suction chamber.

Preferably, there is a seal member between the discharge chamber and the body.

In examples, the ceramic sealing member has an outer cylindrical surrounding wall, a first axial surface, an opposite second axial surface, and defining a center bore extending through the first and second axial surfaces; and the spring seat has: an outer circular flange with a diameter about the same as a diameter of the surrounding wall; a first face surface within the flange; an opposite second face surface; a cylindrical tube extending from the second face surface; and
  a central hole extending through the first face surface, second face surface, and the cylindrical tube; wherein the cylindrical tube extends through the center bore of the ceramic sealing member; and the second face of the spring seat is against the first axial surface of the ceramic sealing member.

Other features and advantages will become apparent from the following specifications and drawings.

BRIEF DESCRIPTION OF THE DRAWINGS

FIG. 7 is a perspective view showing the two-piece suction valve assembly of FIG. 6, exploded to illustrate the discharge valve member and the two-piece suction valve member.

DETAILED DESCRIPTION

A. Disclosure of U.S. Pat. No. 6,231,323

Figure 1:
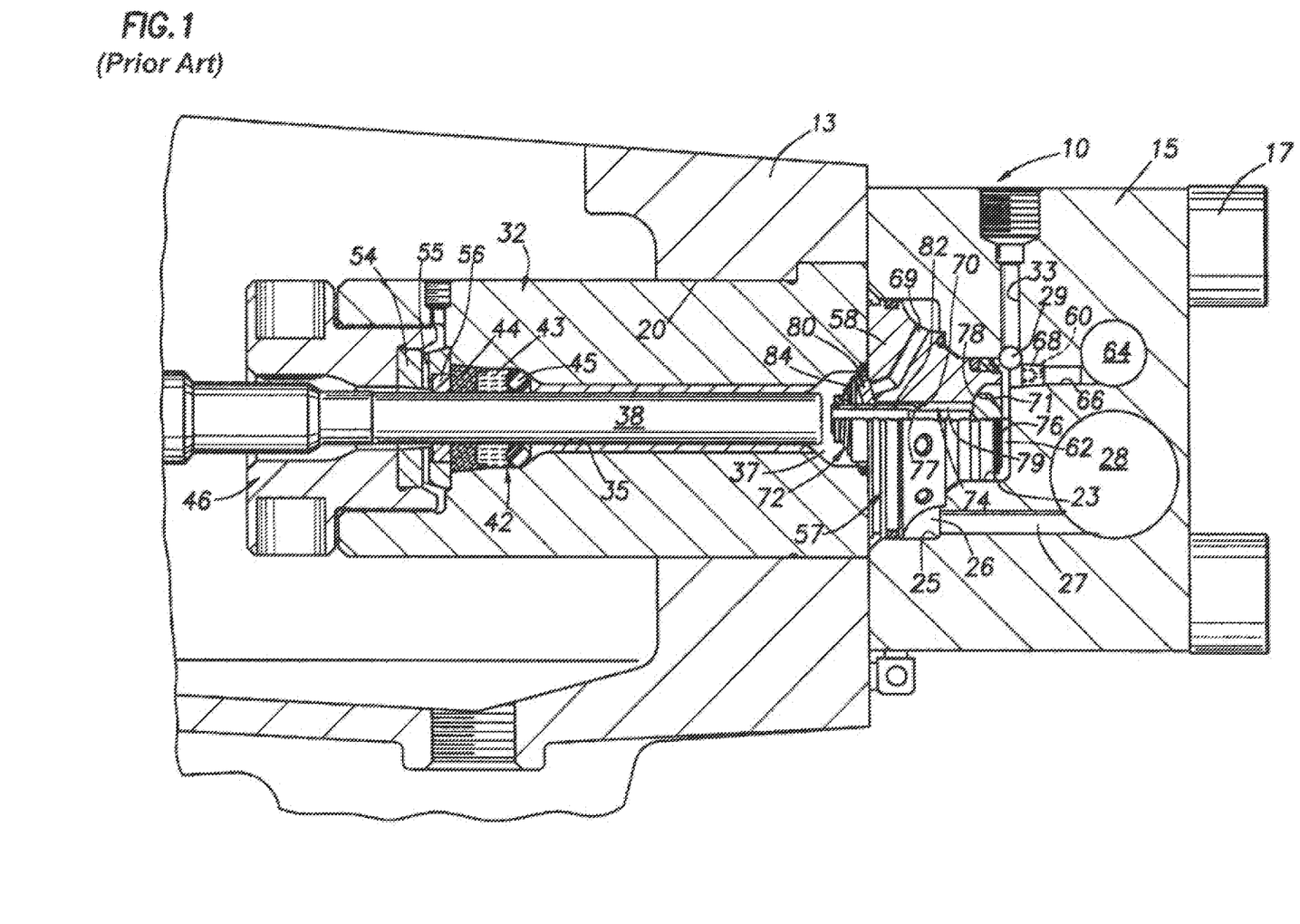
FIG. 1 is a longitudinal cross-sectional view through a fluid end of the high pressure reciprocating pump of the prior art disclosure from U.S. Pat. No. 6,231,323 showing the prior art valve cartridge between the manifold block and adjacent mounting plate with the pump shown in a neutral position between pumping and suction strokes.

Referring to the drawings and in particular FIG. 1, a high pressure reciprocating pump is shown generally at 10 including a rectangular mounting plate or clamping plate 13 bolted to a rectangular manifold block 15 by bolts 17. A cylindrical bore 20 extends through mounting plate 13 and receives a stuffing box 32. A central longitudinal bore 35 extends through stuffing box 32 and forms a pump chamber 37 slidably receiving one end of a cylindrical plunger or piston 38. A plunger packing assembly 42 includes a packing ring 43, an adapter ring 44, and a retainer ring 45 about plunger 38. A packing gland 46 received within stuffing box 32 is effective for mounting of rings 43, 44, and 45. A guide bushing 54 has lubricating ports 55 and fits over a washer 56 preferably formed of tungsten carbide or a hard ceramic material. Rings 43 and 44 may be snapped together in a snap fit. Lubricant flows through ports 55 for cooling and lubricating plunger 38.

Manifold block 15 has a large diameter outer bore portion 25 and a small diameter inner bore portion 23. Mounted within bore portions 23, 25 is a valve cartridge assembly generally indicated at 57 having a body 58 received within bore portions 23 and 25. A suction port 28 has a suction passage 27 exiting therefrom to an annular suction chamber 26. A relatively small diameter discharge port 29 communicates with discharge chamber 62 defined by small diameter bore portion 23. Discharge port 29 is in fluid communication with fluid passage 33. In order to dampen the pulsations resulting from the pump strokes, a fluid accumulator shown at 64 is in fluid communication with discharge chamber 62 through fluid passage 66. Mounted in fluid passage 66 is an externally threaded removable orifice plug 68 having an orifice 60 therein of a predetermined size to provide the desired dampening of pulsations. Orifice plugs having different size orifices may be utilized to provide the desired dampening.

Fixed body 58 of valve cartridge 57 has a plurality of equally spaced relatively small diameter suction openings or holes 69 extending through body 58 and in fluid communication with annular suction chamber 25. Suction openings 69 have entrance ends 61 and exit ends 63. Valve cartridge 57 also includes a central bore 70 and a valve seat 78 adjacent an end of bore 70. Mounted within bore 70 is a valve assembly generally indicated at 72. Valve assembly 72 includes a generally cylindrical discharge valve 74 having a closed outer end 76 and an enlarged diameter tapered a seat surface 71 for sealing against seat 78 on body 58. Discharge valve member 74 has a central bore 77 and elongate lateral slots 79 adjacent tapered seat surface 71 extending laterally through the wall of discharge valve member 74 from bore 77. Annular seals 23A and 25A are provided between fixed body 58 and bore portions 23 and 25. An annular seal 27A is provided between body 58 and stuffing box 32.

Figure 2:
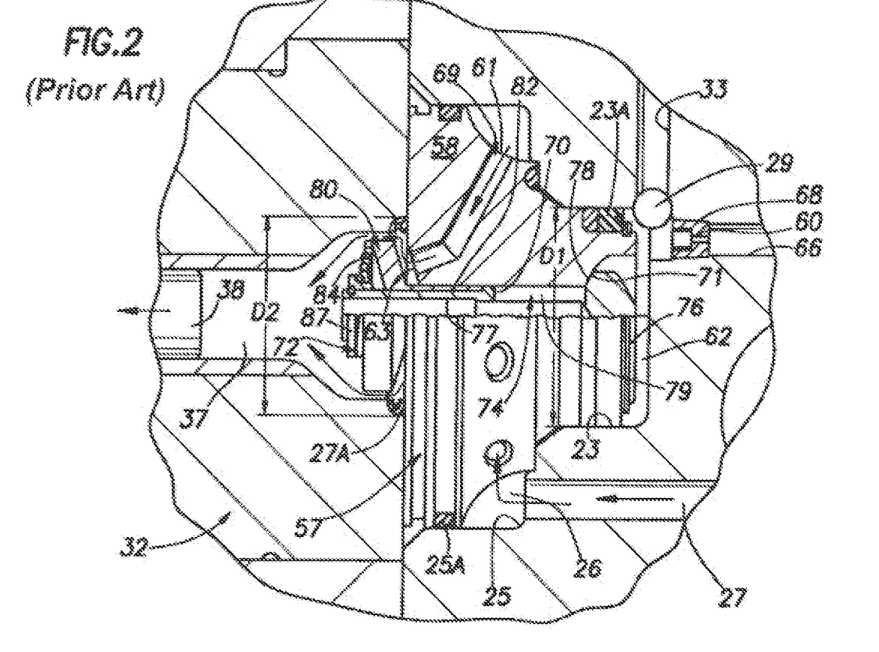
FIG. 2 is an enlarged fragmentary sectional view of the prior art disclosure from U.S. Pat. No. 6,231,323 showing the pump in a suction stroke in which the suction valve member is in an open position and fluid is drawn into the pump chamber through a plurality of relatively small diameter suction openings in the cartridge body.
Figure 3:
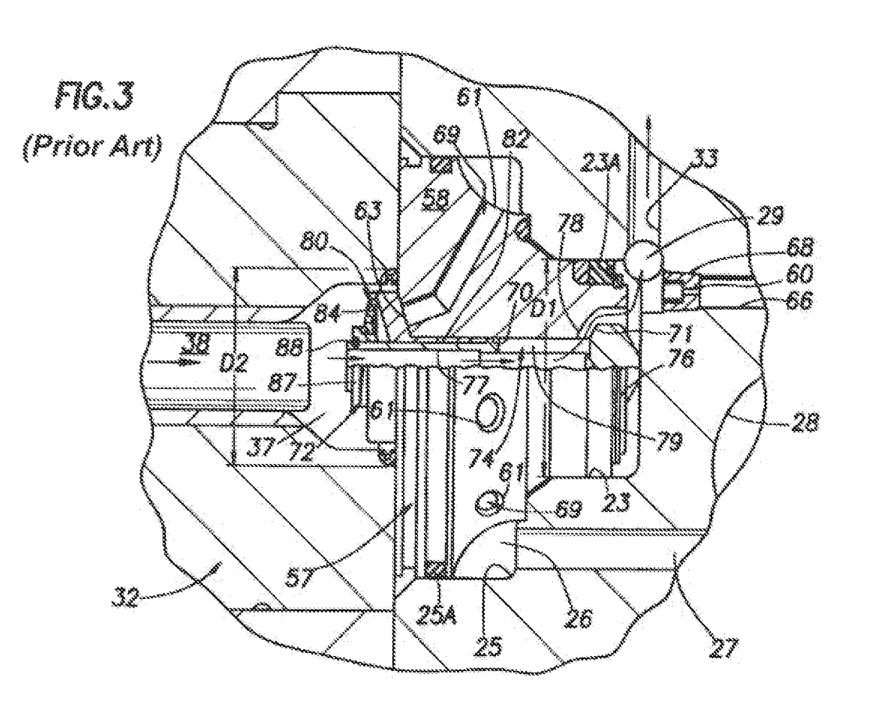
FIG. 3 is a sectional view similar to FIG. 2 of the prior art disclosure from U.S. Pat. No. 6,231,323, but showing the discharge stroke of the pump with pressurized water being forced from the pump chamber through the bore of a central discharge valve member and through lateral openings in the discharge valve member past the valve seat into the discharge port.

An annular suction valve member 80 about cylindrical discharge valve member 74 has a sleeve 82 slidably mounted in a guiding relation along the outer surface of cylindrical discharge valve member 74 and extending laterally at one end over suction opening 19. A spring 84 of a frusto-conical shape is biased between discharge valve member 74 and suction valve member 80 for continuously urging suction valve member 80 in a closed position over exit ends 63 of suction openings 69. Frusto-conical springs 84 fits within a relatively small space and biases valve members 74 and 80 in opposed relation to continuously urge discharge valve member 74 to a closed seated position on seat 78. A spring retainer 87 is mounted about discharge valve member 74 and a c-shaped lock ring 88 removably secures spring retainer 87 on valve member 74. FIG. 2 shows valve members 74 and 80 in the position of the suction stroke of piston 38. FIG. 3 shows valve members 74 and 80 in the position of the power stroke of piston 38 with pressurized fluid being forced into discharge chamber 62 and discharge port 29. Piston 38 and valve members 74, 80 are shown in FIG. 1 in a neutral position at the end of the power stroke after discharge valve member 74 returns to a closed seated position on seat 78. Water is constantly supplied to annular suction chamber 26.

An area A1 is formed by discharge chamber 62 having a diameter D1 defined by the outer periphery of seal 23A. An area A2 is formed by the outer diameter D2 of seal 27A at pump chamber 37. To obtain optimum sealing during pumping and suction strokes, it is preferred that area A1 be about ten (10) percent greater than the area of A2. Satisfactory results may be obtained with area A1 being between about five (5) percent and twenty-five (25) percent greater than the area A2. Since area A1 is greater than area A2 fluid pressure in discharge chamber 62 is utilized to force body 58 into sealing contact with stuffing box 32.

Figures 4, 5:
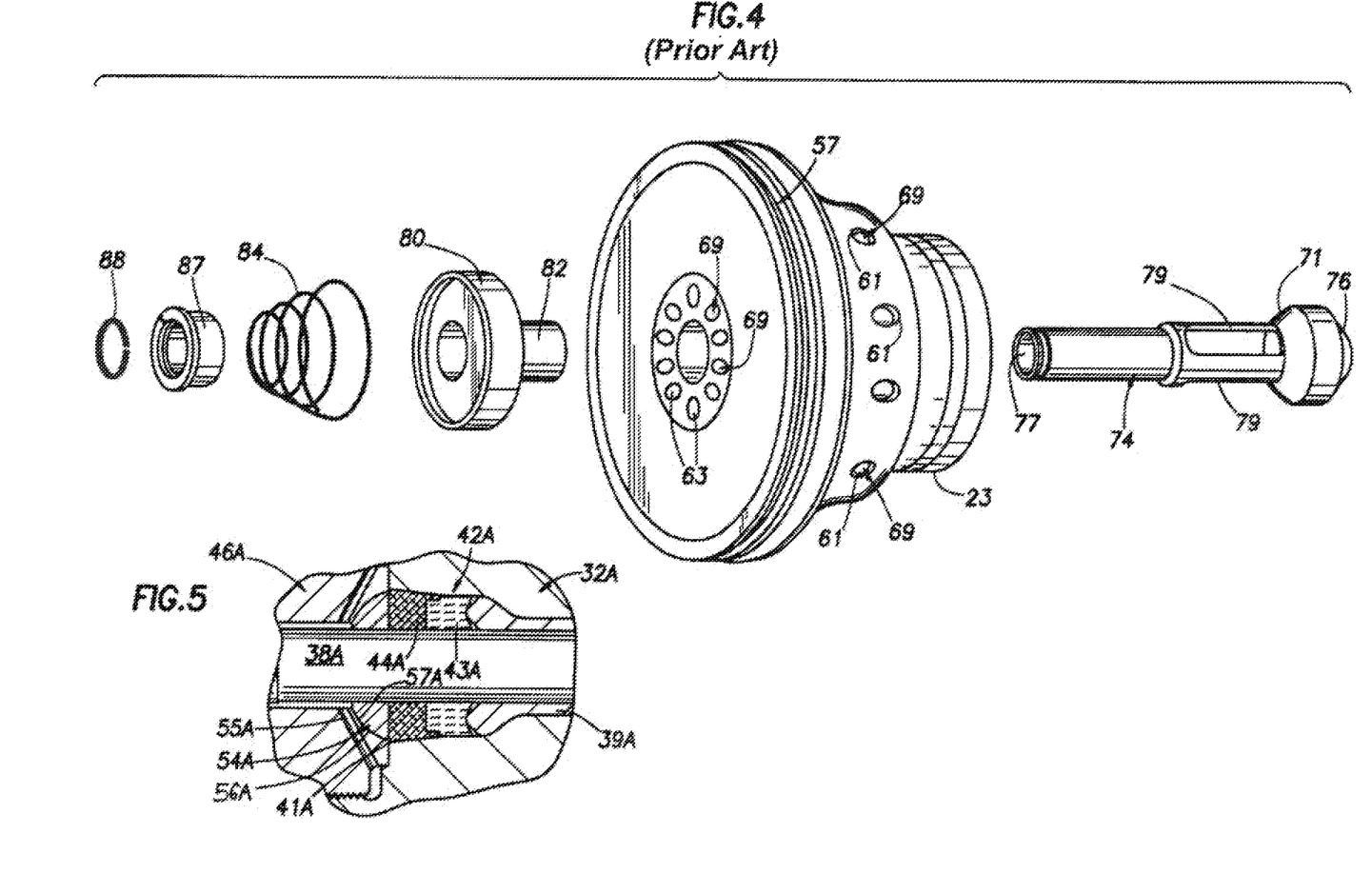
FIG. 4 is a perspective view of the prior art disclosure from U.S. Pat. No. 6,231,323 showing the valve assembly exploded to illustrate the discharge valve member and the suction valve member.
FIG. 5 is an enlarged section of a modified packing assembly for the stuffing box and plunger of the prior art disclosure from U.S. Pat. No. 6,231,323.

A modified packing assembly 42A is shown in FIG. 5 in which an alignment bushing 54A is shown about piston 38A in engagement with backup ring 44A. Bushing 54A has a bore and an outer spherical surface 56A adjacent the bore. Packing gland 46A has a concave recess 57A defining a spherical surface and Alp receiving bushing 54A. Limited relative movement is permitted between bushing 54A and packing gland 46A. Packing ring 43A formed of a fibrous material is press fitted within backup ring 44A with a snap fit. Sleeve 39A about shaft 38A is in engagement with packing ring 43A. Packing gland 46A which receives bushing 54A also contacts the outer marginal edge portion 41A of backup ring 44A which is normally formed of a plastic material. Bushing 54A easily aligns and conforms to piston 38A and compensates for small misalignments of piston 38A. Lubricant openings 55A are provided in packing gland 46A.

For further details of pump 10, reference is made to the aforementioned U.S. Pat. No. 4,878,815 dated Nov. 7, 1989, the entire disclosure of which is incorporated by this reference.

Operation

During the suction stroke of plunger 38 as shown in FIG. 2 moving to the left from the position of FIG. 1, suction valve member 80 moves to an open position to open exit ends 63 of suction openings 69 against the bias of spring 84 and water from annular chamber 26 flows through suction openings 69 into pump chamber 37 adjacent the end of piston 38. Spring 84 retains the discharge valve member 74 in a closed seated position on seat 78.

During the power stroke of piston 38 as shown in FIG. 3 moving to the right from the end of the suction stroke, suction valve member 80 closes exit ends 63 of suction openings 69 under the bias of spring 84 and pressurized water is forced from pump chamber 37 by plunger 38 against valve member 74 to unseat and open discharge valve member 74. Upon opening of discharge valve member 74, pressurized fluid is forced through bore 77 and lateral slots 79 past seat 78 into discharge chamber 62 to discharge port 29 and accumulator 64.

The arrangement of the suction and discharge valves 80, 74 as set forth above, provides for the flow of relatively low pressure water on the suction stroke through a plurality of relatively small diameter suction openings 69 which are closed on the power stroke. During the power stroke, the high pressure water is forced through the relatively large central bore 77 of discharge valve member 74 and then out through relatively large lateral slots 79 to discharge port 29. The relatively large lateral slots 79 are provided with chamfered corners and can be easily alloyed with a hard alloy material. Such an arrangement tends to minimize stress concentrations and to permit the surfaces exposed to the high pressure water to be easily hardened with a suitable material.

B. The Improved Valve Assembly

To improve the above-described pump 10, a two-piece suction valve 280 is provided. In general, and in reference now to FIGS. 6-8, the two-piece suction valve 280 includes a spring seat 282 and a hard sealing member 284. The hard sealing member 284 is preferably made from a ceramic material, and as such, is extremely hard, thus almost eliminating possibility of a contaminant in the supply water damaging it. The mating surface 286 on the valve cartridge 57 can still be damaged. However, when this occurs, the damage does not progress as it would without the hard sealing member 284. The hard sealing member 284 is hard enough that it can crush the contaminant, making it easier for the pumped fluid to flush it away. The hard sealing member 284 can also help peen the displaced material back into position, possibly preventing the formation of a high-velocity jet and the subsequent cavitation erosion damage. Also, there is no possibility of galling between the hard sealing member 284 and the mating surface 286 of the valve cartridge 57. The two-piece suction valve 280 is used in the above described pump 10, in place of the prior art suction valve 80, which achieves these advantages.

Figure 6:
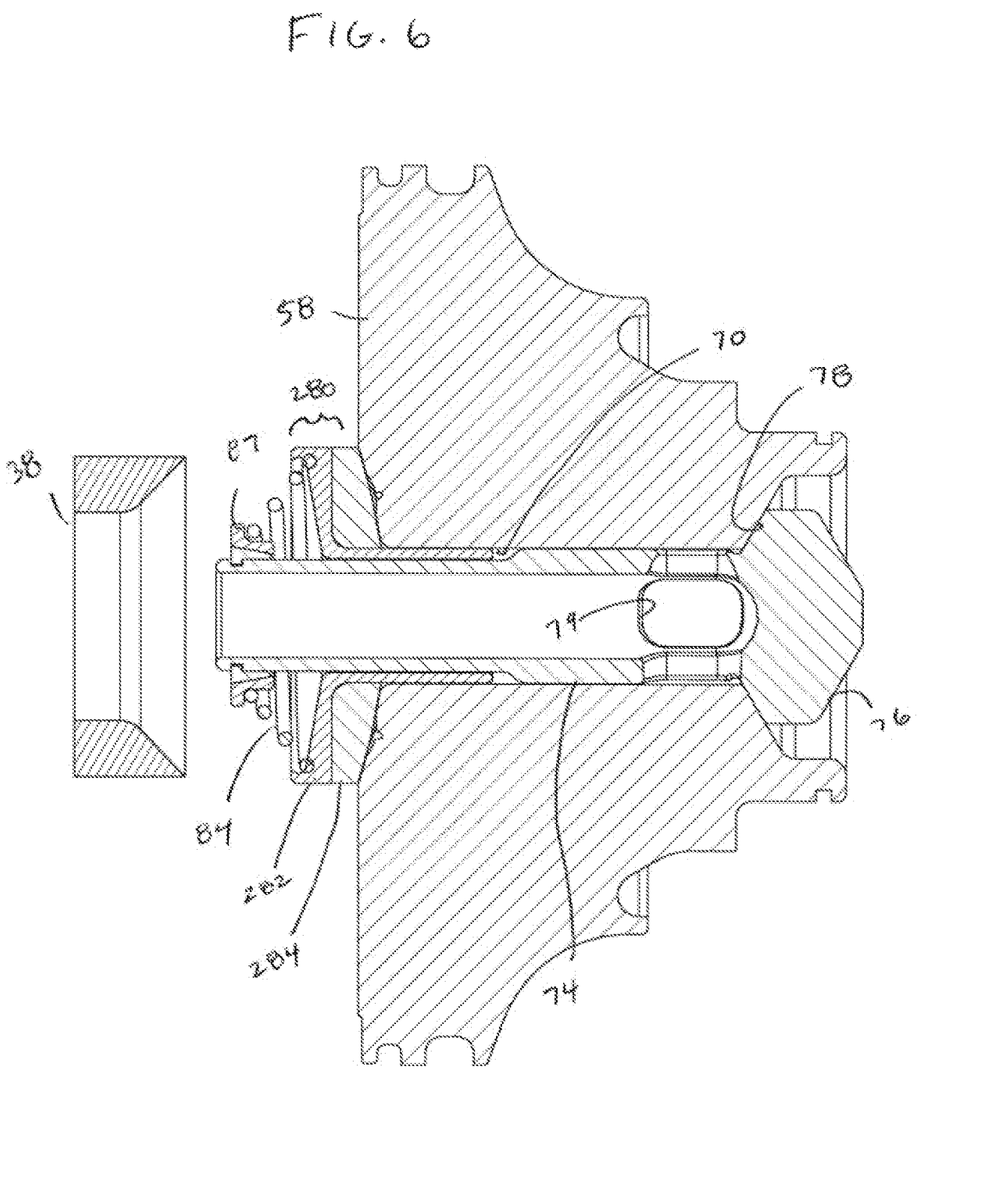
FIG. 6 is a sectional view similar to FIG. 3 but showing the pump with an improved two-piece suction valve assembly, constructed in accordance with principles of this disclosure.
Figure 8:
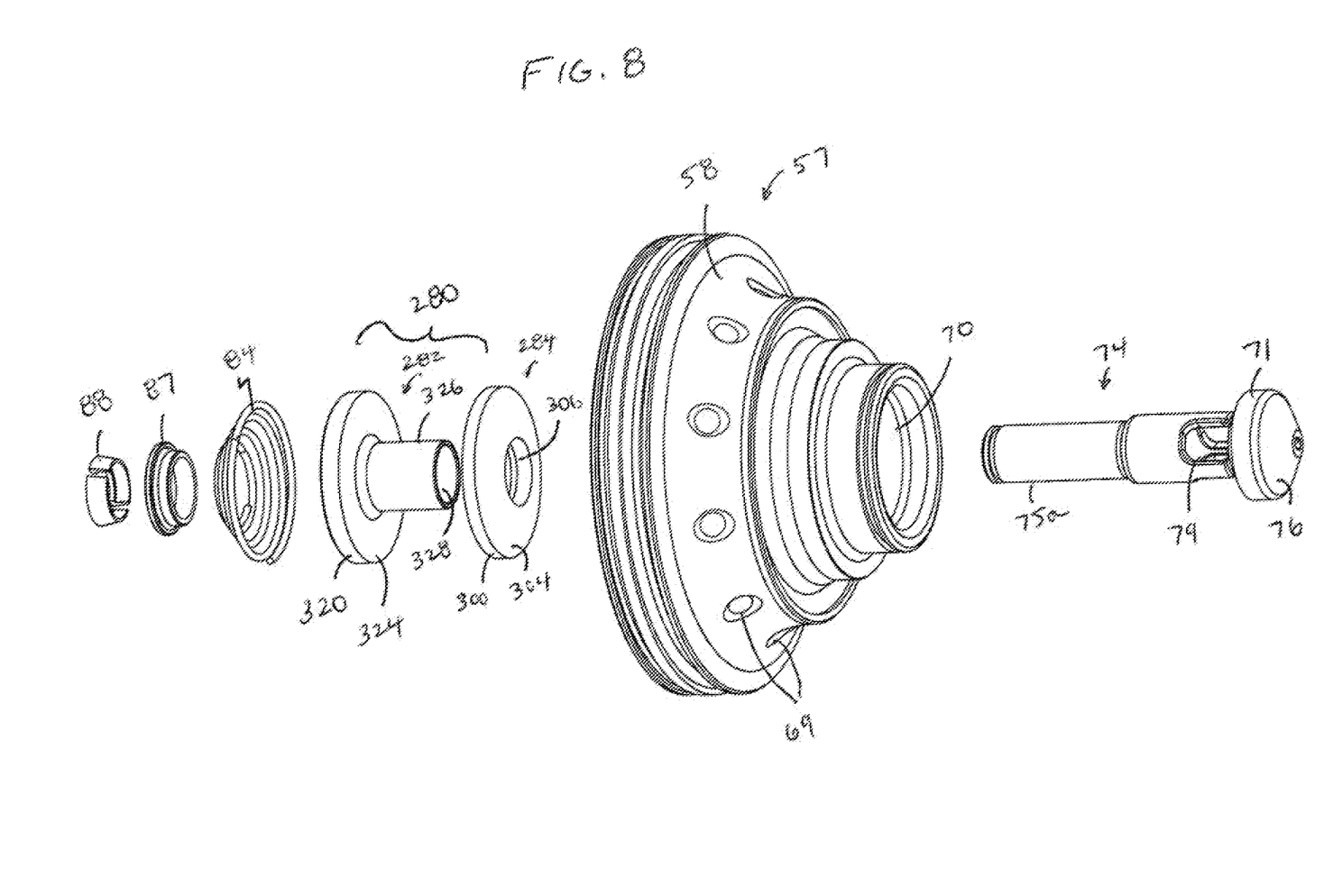
FIG. 8 is the same as FIG. 7, but shown from the opposite perspective.

In FIGS. 6-8, the hard sealing member 284 has an outer cylindrical surrounding wall 300, a first axial surface 302, an opposite second axial surface 304, and defining a center bore 306 extending through the first axial surface 302 and second axial surface 304. As such, in general, the hard sealing member 284 has the shape of a hollow cylinder or washer. The hard sealing member 284 is made from a very hard material, typically with a hardness of above 1050 Vickers. Preferably, the hard sealing member 284 comprises a ceramic material. In some implementations, the hard sealing member 284 consists essentially of a ceramic material, such as partially stabilized zirconia (PSZ). In some cases, the hardness is above 1100 Vickers, and in some cases, the hardness is above 1200 Vickers and less than 1300 Vickers.

The spring seat 282 includes an outer circular flange 320 with a diameter about the same as a diameter of the surrounding wall 300 of the hard sealing member 284. A first face surface 322 is within, and surrounded, or circumscribed, by the flange 320. A second face surface 324 is on an opposite side of the first face surface 322.

A cylindrical tube 326 extends from the second face surface 324. The tube 326 has an outer diameter less than the diameter of the bore 306 of the hard sealing member 284. A central hole 328 extends through the first face surface 322, second face surface 324, and the cylindrical tube 326. The central hole 328 has a diameter less than the diameter of the circular flange 320. The spring seat 282 preferably comprises stainless steel.

When the spring seat 282 and hard sealing member 284 are assembled together to form the two-piece suction valve assembly 280, the cylindrical tube 326 extends through the center bore 306 of the hard sealing member 284, and the second face surface 324 of the spring seat 282 is against the first axial surface 302 of the hard sealing member 284. The cylindrical tube 326 projects outward and away from the second axial surface 304 of the hard sealing member 284.

As can be seen from reviewing FIGS. 6-8, the first face surface 322 is sloped from the flange 320 to the center hole 328. In addition, the first axial surface 302 of the hard sealing member 284 is sloped from the surrounding wall 300 to the center bore 306.

FIGS. 6-8 illustrate the valve cartridge 57 using the two-piece suction valve assembly 280. Referring first to prior art FIG. 1, the valve cartridge 57 is positioned in an opening between manifold block 15 and mounting plate 13 of the high pressure reciprocating pump 10 with reciprocating plunger 38 adjacent the valve cartridge 57 for operation of the pump 10 in a suction stroke and a discharge stroke. As previously described, and shown in FIGS. 6-8, the valve cartridge 57 includes body 58 having cylindrical bore 70 defining inner peripheral surface and an annular valve seat 78 adjacent an end of the bore 70. The discharge valve member 74 has cylindrical body 75 mounted within the bore 70 against the inner peripheral surface with one end of the valve member 74 adjacent the plunger 38 and opposed end of the valve member being closed 76 and having enlarged diameter 71 to define seating surface 71a for engaging the valve seat 78. The discharge valve member 74 has circumferential wall 75a defining central bore 77. The circumferential wall 75a has plurality of radially spaced openings 79 adjacent the closed end 76. Spring member 84 continuously urges the discharge valve member 74 into sealing relation with the valve seat 78. Pump chamber 37 (FIG. 1) is defined between the plunger 38 and the discharge valve member 74.

The two piece suction valve assembly 280 is slidably mounted about the discharge valve member 74 and permits fluid to enter the pump chamber 37 during the suction stroke of the plunger 38. The plunger 38 in the discharge stroke forces fluid through the discharge valve member 74 for unseating of the discharge valve member 74 and discharge of pressurized fluid through the openings 79 past the seat 78 into discharge chamber 62 (FIG. 2). The effective area of the discharge chamber 62 is greater than the effective area of the pump chamber 37 for urging hydraulically the body 58 against the mounting plate 13.

As can be seen in FIG. 6, the spring member 84 is compressed between the spring seat 282 and the spring retainer 87 for continuously biasing the two piece suction valve assembly 280 and the discharge valve member 74 toward the closed position.

The plurality of suction openings 69 are spaced about the outer periphery of the valve cartridge body 58 and extend through the body 58 for providing fluid communication between suction chamber 26 (FIG. 1) adjacent the valve cartridge 57 and the pumping chamber 37 (FIG. 1). The two piece suction valve assembly 280 is positioned in a closed position over the suction openings 69 adjacent the pump chamber 37.

In FIG. 6, the hard sealing member 284 of the two piece suction valve assembly 280 extends over the suction openings 69. The two piece suction valve assembly 280 is in sliding contact relation with the inner peripheral surface of the bore 70 and the cylindrical body 75 for being guided therebetween.

As described previously, and in reference to FIG. 1, the high pressure reciprocating fluid pump 10 includes the stuffing box 32 fitting against the manifold block 15. The clamping plate 13 is removably secured to the manifold block 15 and mounts the stuffing box 32 onto the manifold block 15. The reciprocating plunger 38 is mounted within the stuffing box 32. The valve cartridge 57 is positioned in an opening between the manifold block 15 and the stuffing box 32. The two piece suction valve assembly 280 permits fluid to enter the pump chamber 37 during a suction stroke of the plunger 38. The plunger 38 on the discharge stroke forces fluid through the axial bore 77 of the discharge valve member 74 for unseating of the discharge valve member 74 and discharge of fluid through the axial bore 77 past the seat 78 into the discharge chamber 62.

The above represents example principles. Many embodiments can be made using these principles.

What is claimed is:

1. A two piece suction valve assembly comprising:
   (a) a hard seal having an outer cylindrical surrounding wall, a first axial surface, an opposite second axial surface, and defining a center bore extending through the first and second axial surfaces; and
   (b) a spring seat having,
      (i) an outer circular flange with a diameter substantially the same as a diameter of the surrounding wall;
      (ii) a first face surface within the flange;
      (iii) an opposite second face surface;
      (iv) a cylindrical tube extending from the second face surface; and
      (v) a central hole extending through the first face surface, second face surface, and the cylindrical tube;
   wherein the cylindrical tube extends through the center bore of the hard seal with the second face surface of the spring seat in direct contact against the first axial surface of the hard seal to form an integrated two-piece assembly; and the first and second face surfaces of the spring seat and first and second axial surfaces of the hard seal all define a substantially similar shape and surface area.

2. The two piece suction valve assembly of claim 1 wherein the first face surface is sloped from the flange to the center hole.

3. The two piece suction valve assembly of claim 1 wherein the first axial surface is sloped from the surrounding wall to the center bore.

4. The two piece suction valve assembly of claim 1 wherein the cylindrical tube projects outward and away from the second axial surface of the hard seal.

5. The two piece suction valve assembly of claim 1 wherein the central hole has a diameter less than 35% of the diameter of the circular flange.

6. The two piece suction valve assembly of claim 1 wherein:
   (a) the spring seat is stainless steel; and
   (b) the hard seal is ceramic.

7. A valve cartridge for positioning in an opening between a manifold block and a mounting plate of a high pressure reciprocating pump with a reciprocating plunger adjacent the valve cartridge for operation of the pump in a suction stroke and a discharge stroke; the valve cartridge comprising:
   (a) a body having a cylindrical bore defining an inner peripheral surface and an annular valve seat adjacent an end of the bore;
   (b) a discharge valve having a cylindrical body mounted within the bore against the inner peripheral surface with one end of the valve adjacent the plunger and an opposed end of the valve being closed and having an enlarged diameter to define a seating surface for engaging the valve seat; the discharge valve having a circumferential wall defining a central bore, the circumferential wall having a plurality of openings adjacent the closed end;
   (c) a spring continuously urging the discharge valve into sealing relation with the valve seat;
   (d) a pump chamber defined between the plunger and the discharge valve; and
   (e) a two piece suction valve assembly including a spring seat held within a hard seal; the two piece suction valve assembly being slidably mounted about the discharge valve and permitting fluid to enter the pump chamber during the suction stroke of the plunger; the plunger in the discharge stroke forcing fluid through the discharge valve for unseating of the discharge valve and discharge of pressurized fluid through the openings past the seat into a discharge chamber; the effective area of the discharge chamber being greater than the effective area of the pump chamber for urging hydraulically the body against the mounting plate;
   wherein the spring seat comprises a first and second face surface and a cylindrical tube extending from the second face surface; the hard seal comprises a first and second axial face surface and a center bore extending through the first and second axial face surfaces; and the first and second face surfaces and the first and second axial face surfaces all define a substantially similar shape and surface area;
   where the cylindrical tube extends through the center bore of the hard seal with the second face surface of the spring seat in direct contact against the first axial surface of the hard seal to form an integrated two-piece assembly.

8. A valve cartridge according to claim 7 wherein the spring is compressed between the spring seat and a spring retainer for continuously biasing the two piece suction valve assembly and the discharge valve toward closed position.

9. A valve cartridge according to claim 7 wherein a plurality of suction openings are spaced about the outer periphery of the valve cartridge body and extend through the body for providing fluid communication between a suction chamber adjacent the valve cartridge and the pump chamber; the two piece suction valve assembly being positioned in closed position over the suction openings adjacent the pump chamber.

10. A valve cartridge according to claim 7, further comprising: a plurality of suction openings spaced about the outer periphery of the valve cartridge body, the hard seal of the two piece suction valve assembly extending over the suction openings.

11. A valve cartridge according to claim 7, wherein the two piece suction valve is in sliding contact relation with the inner peripheral surface of the bore and the cylindrical body for being guided therebetween.

12. A valve cartridge according to claim 11 wherein the spring seat and hard seal are positioned about the cylindrical discharge valve and mounted for relative sliding movement thereon.

13. A valve cartridge according to claim 12 wherein:
   the spring seat is stainless steel; and
   the hard seal is ceramic.

14. In a high pressure reciprocating fluid pump having a manifold block, a stuffing box fitting against the manifold block, a clamping plate removably secured to the manifold block and mounting the stuffing box onto the manifold block, and a reciprocating plunger mounted within the stuffing box; a valve cartridge positioned in an opening between the manifold block and the stuffing box, the valve cartridge comprising:
   a body having a central bore therethrough and a fixed valve seat adjacent an end of the central bore;
   a cylindrical discharge valve mounted within the bore, the discharge valve having a circumferential wall defining an axial bore with a closed downstream end having an enlarged diameter defining a seating surface for seating on the fixed valve seat during a suction stroke and moveable to an unseated position during a discharge stroke of plunger;

a spring continuously urging the discharge valve into sealing relation with the valve seat;

a pump chamber defined between the plunger and the discharge valve; and a two piece suction valve assembly permitting fluid to enter the pump chamber during a suction stroke of the plunger, the two piece suction valve assembly including a spring seat held within a ceramic seal wherein the spring seat comprises a first and second face surface and a cylindrical tube extending from the second face surface; the ceramic seal comprises a first and second axial face surface and defining a center bore extending through the first and second axial face surfaces; and the first and second face surfaces and the first and second axial face surfaces all define a substantially similar shape and surface area; and the plunger on a discharge stroke forcing fluid through the axial bore of the discharge valve for unseating of the discharge valve and discharge of fluid through the axial bore past the seat into a discharge chamber.

15. In a high pressure reciprocating fluid pump according to claim 14, wherein the spring seat and ceramic seal are positioned about the cylindrical discharge valve and mounted for relative sliding movement thereon.

16. In a high pressure reciprocating fluid pump according to claim 14, wherein the spring has opposed ends seated on the spring seat and the spring retainer for continuously biasing the two piece suction valve assembly and the discharge valve toward a closed position.

17. In a high pressure reciprocating fluid pump according to claim 14, further comprising:

a suction port in the manifold block, and a suction passage extending from the suction port to an annular suction chamber.

18. In a high pressure reciprocating fluid pump according to claim 14, further comprising a seal between the discharge chamber and the body.

* * * * *